(12) United States Patent
Abe

(10) Patent No.: US 9,627,129 B2
(45) Date of Patent: Apr. 18, 2017

(54) NON-CONTACT POWER SUPPLY SYSTEM

(75) Inventor: Hideaki Abe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 497 days.

(21) Appl. No.: 14/344,673

(22) PCT Filed: Apr. 26, 2012

(86) PCT No.: PCT/JP2012/061234
§ 371 (c)(1),
(2), (4) Date: Mar. 13, 2014

(87) PCT Pub. No.: WO2013/042399
PCT Pub. Date: Mar. 28, 2013

(65) Prior Publication Data
US 2014/0361633 A1 Dec. 11, 2014

(30) Foreign Application Priority Data
Sep. 21, 2011 (JP) .................................. 2011-206030

(51) Int. Cl.
*H01F 38/14* (2006.01)
*H02J 5/00* (2016.01)
(Continued)

(52) U.S. Cl.
CPC .............. *H01F 38/14* (2013.01); *H02J 5/005* (2013.01); *H02J 50/12* (2016.02); *H02J 7/025* (2013.01)

(58) Field of Classification Search
CPC . H01F 38/14; H02J 5/005; H02J 7/025; H02J 17/00; H02J 50/10; H02J 50/12;
(Continued)

(56) References Cited

U.S. PATENT DOCUMENTS 7,906,936 B2 * 3/2011 Azancot .................... G06F 1/26
320/108
8,618,695 B2 * 12/2013 Azancot .................. H02J 5/005
307/104
(Continued)

FOREIGN PATENT DOCUMENTS

GB    2 101 857 A    1/1983
JP    07-002311 A    1/1995
(Continued)

OTHER PUBLICATIONS

Japanese Office Action dated Nov. 4, 2015 for corresponding Japanese Application No. 2011-206030 and English translation.
(Continued)

*Primary Examiner* — Levi Gannon
(74) *Attorney, Agent, or Firm* — Renner, Otto, Boisselle & Sklar, LLP

(57) ABSTRACT

In the present invention, it is possible to activate an electrical device, such as a flat-screen television or a photo frame, while the electrical device is located in a housing space (41) of a movable assembly (30). The degree of freedom in selecting the electrical device to be placed in the movable assembly (30) can be thus increased. Moreover, since a sliding door (movable assembly (30)) is moveable by sliding, the position of the sliding door, and thus of the electrical device, can be altered as a user desires.

16 Claims, 12 Drawing Sheets

(51) Int. Cl.
*H02J 7/02* (2016.01)
*H04B 5/00* (2006.01)
*H02J 50/12* (2016.01)

(58) Field of Classification Search
CPC .. H04B 5/0037; H04B 5/0075; H04B 5/0081; H04B 5/0087; H04B 5/0093
USPC .......................................................... 307/104
See application file for complete search history.

(56) References Cited

U.S. PATENT DOCUMENTS

| | | | |
|---|---|---|---|
| 2005/0056194 A1* | 3/2005 | Danna | A47B 21/03 108/143 |
| 2010/0181841 A1* | 7/2010 | Azancot | H01F 38/14 307/104 |
| 2010/0201201 A1* | 8/2010 | Mobarhan | H02J 5/005 307/104 |
| 2010/0219183 A1* | 9/2010 | Azancot | H02J 5/005 219/676 |
| 2010/0290215 A1* | 11/2010 | Metcalf | A47B 21/00 362/127 |
| 2010/0314946 A1* | 12/2010 | Budde | H02J 5/005 307/104 |
| 2011/0089768 A1* | 4/2011 | Byrne | H01F 38/14 307/104 |
| 2011/0156636 A1 | 6/2011 | Kim | |
| 2011/0181238 A1* | 7/2011 | Soar | B60N 2/24 320/108 |
| 2012/0068552 A1 | 3/2012 | Nishino | |
| 2012/0112553 A1* | 5/2012 | Stoner, Jr. | H02J 5/005 307/104 |

FOREIGN PATENT DOCUMENTS

| | | |
|---|---|---|
| JP | 7-14734 U | 3/1995 |
| JP | 2003-082867 A | 3/2003 |
| JP | 2003-204637 A | 7/2003 |
| JP | 2003-299204 A | 10/2003 |
| JP | 2005-213737 A | 8/2005 |
| JP | 2009-118556 A | 5/2009 |
| JP | 2011-028381 A | 2/2011 |
| JP | 2011-109810 A | 6/2011 |
| JP | 2011-147513 A | 8/2011 |
| JP | 2011-151900 A | 8/2011 |
| JP | 2011-167031 A | 8/2011 |
| KR | 10-2008-0032519 A | 4/2008 |
| KR | 10-2010-0005698 A | 1/2010 |
| KR | 10-2011-0075365 A | 7/2011 |
| WO | WO 03/105308 A1 | 12/2003 |
| WO | WO 2008/044875 A1 | 4/2008 |
| WO | WO 2008/093334 A2 | 8/2008 |
| WO | WO 2010/147168 A1 | 12/2010 |
| WO | WO 2011/112795 A1 | 9/2011 |

OTHER PUBLICATIONS

Korean Office Action dated May 2, 2016 for corresponding Korean Application No. 10-2014-7007131.
Extended European Search Report for corresponding European Application No. 12833500.7 dated Aug. 14, 2015.
Chinese Office Action and Search Report (including English translation of Search Report) for corresponding Chinese Application No. 201280045471.3 dated Jul. 3, 2015.
International Preliminary Report on Patentability for corresponding International Application No. PCT/JP2012/061234 mailed May 29, 2012 (English translation).
International Search Report for corresponding International Application No. PCT/JP2012/061234 mailed May 29, 2012.

\* cited by examiner

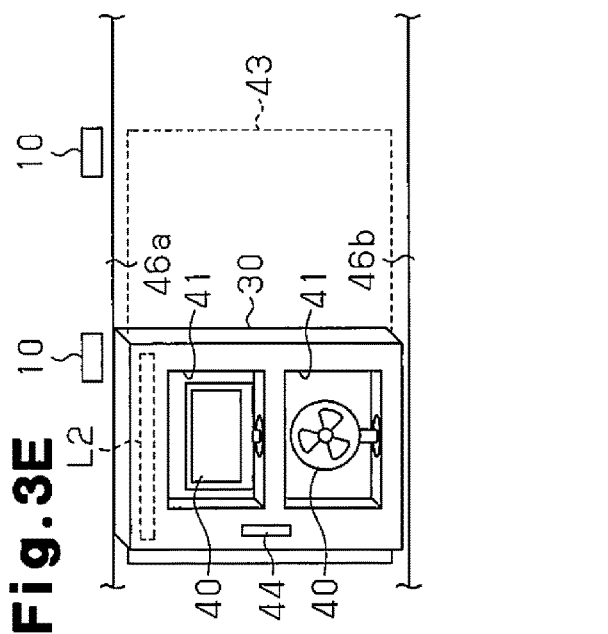
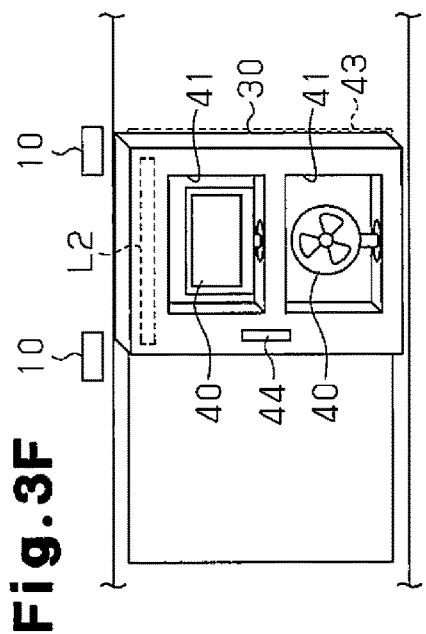
Fig.3C   Fig.3D   Fig.3E   Fig.3F
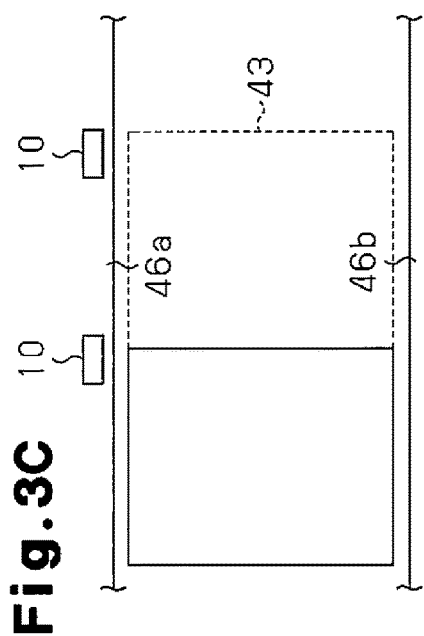
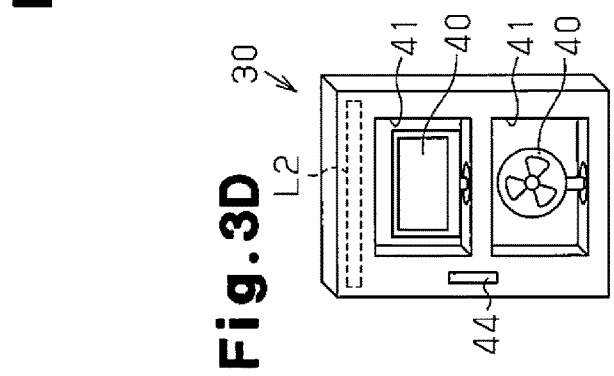
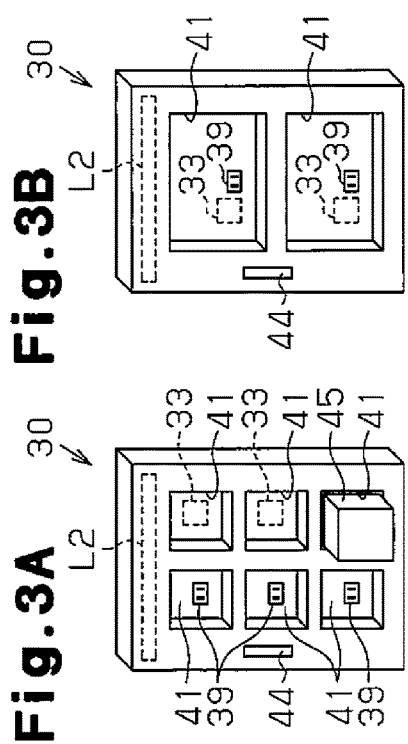
Fig.3A   Fig.3B

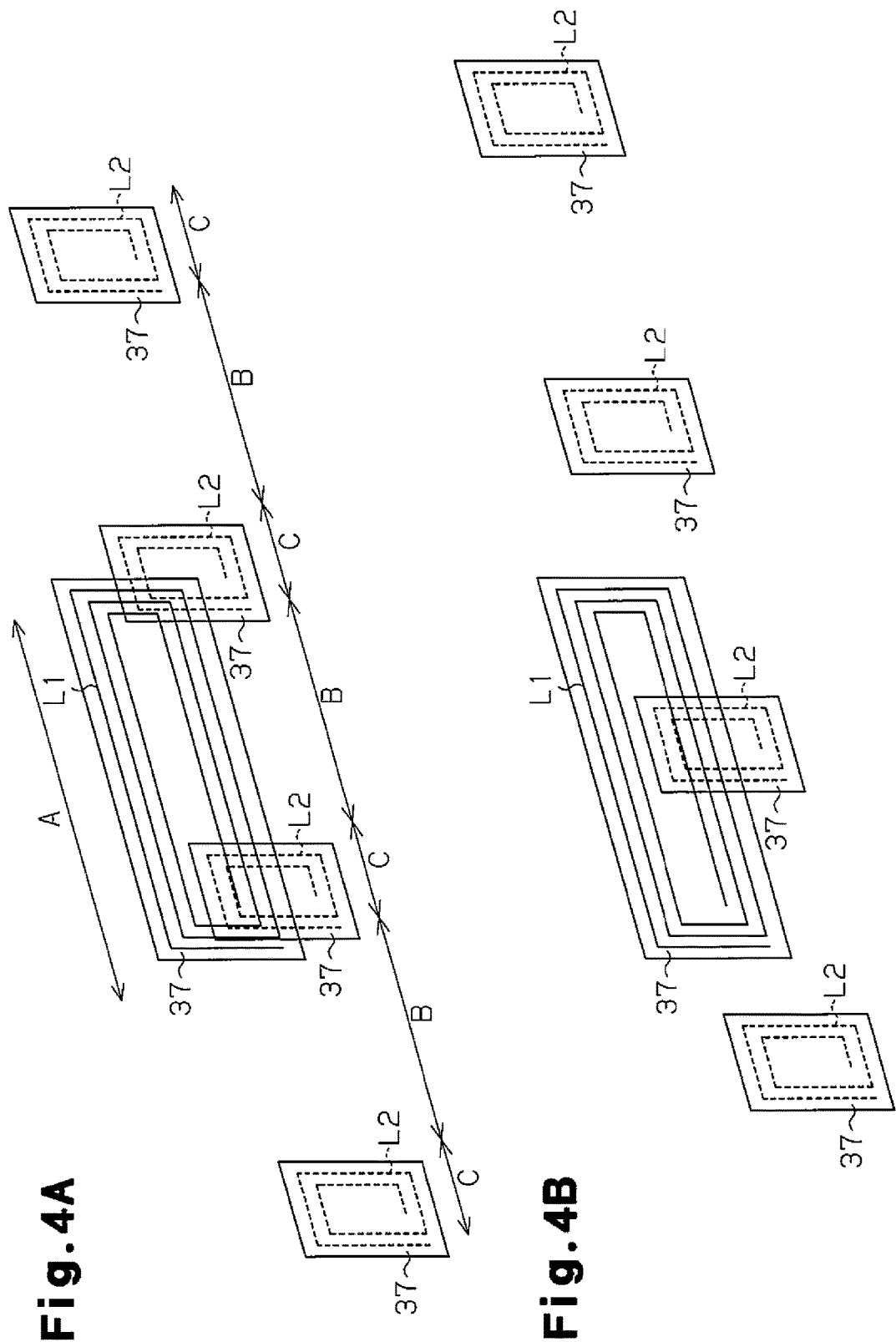

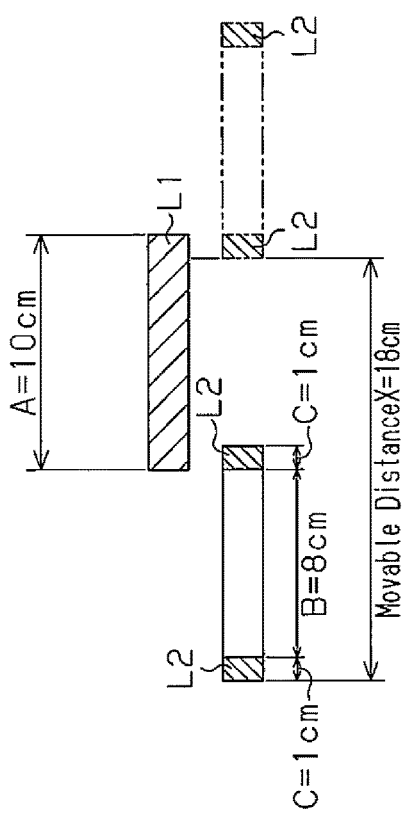
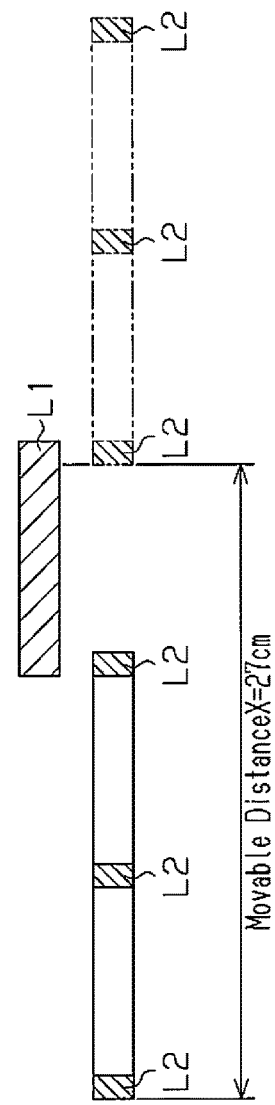
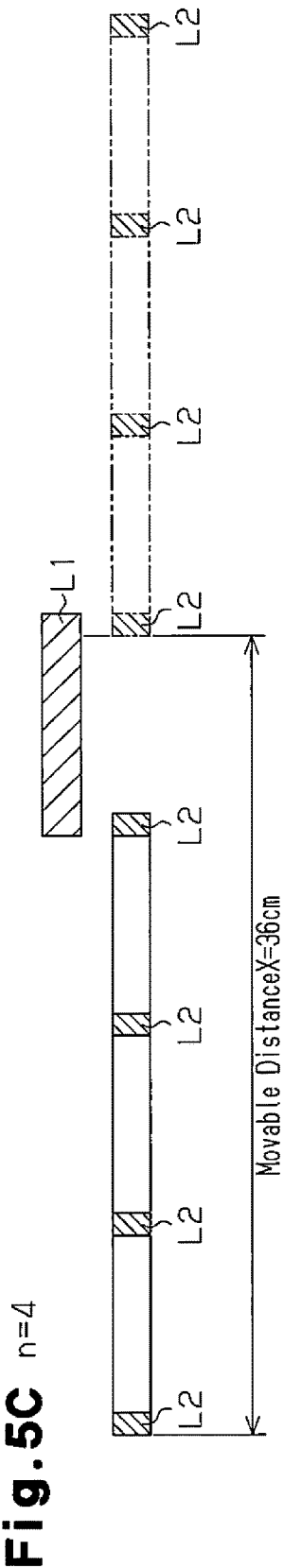
Fig.5A n=2
Fig.5B n=3
Fig.5C n=4

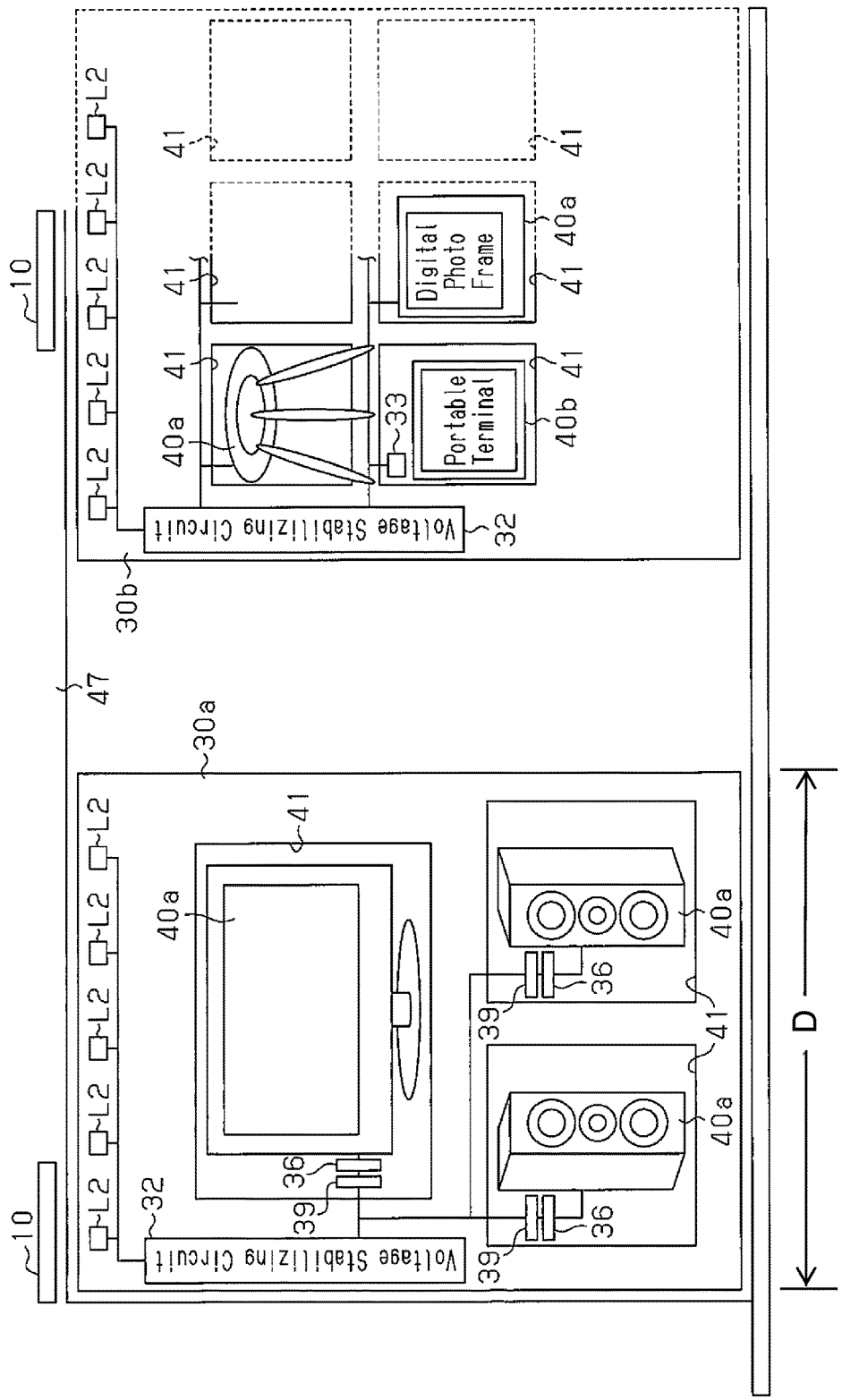

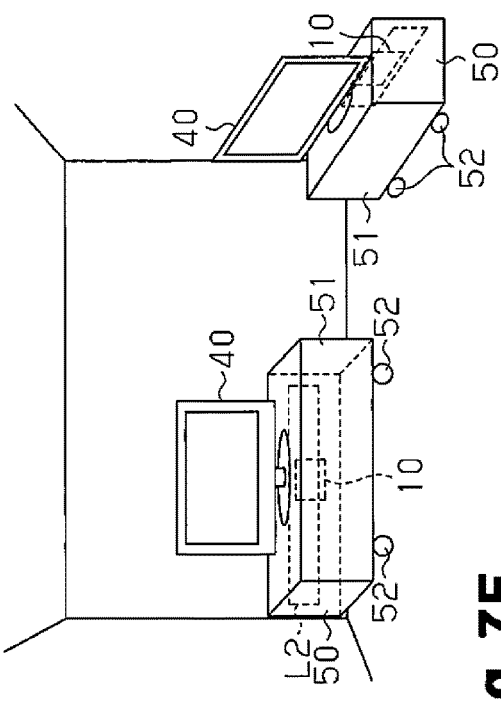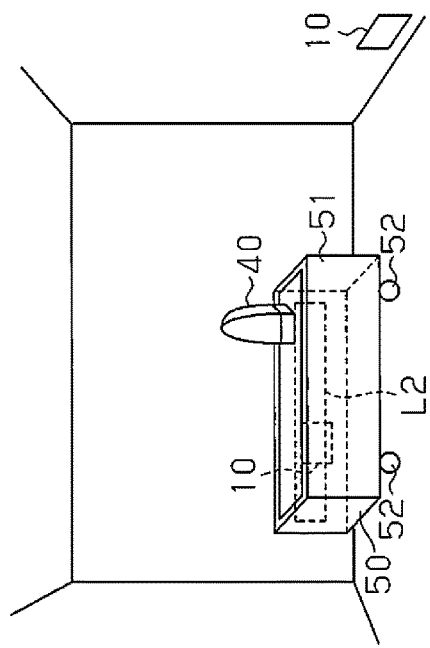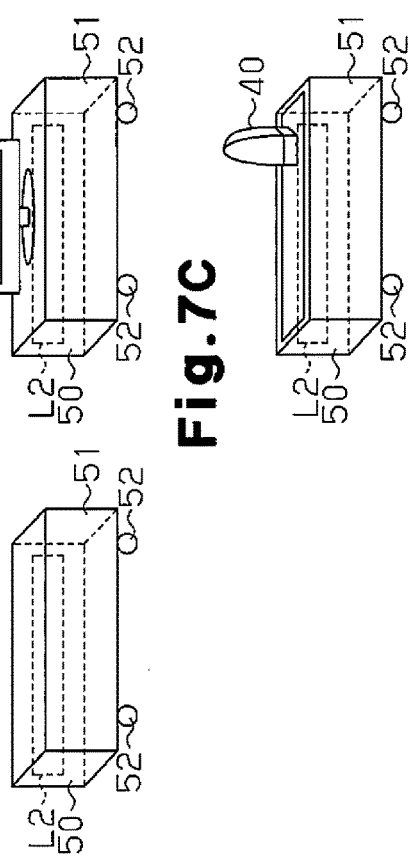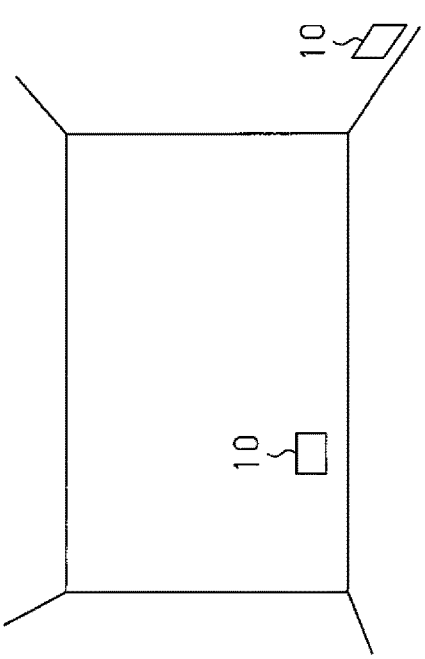

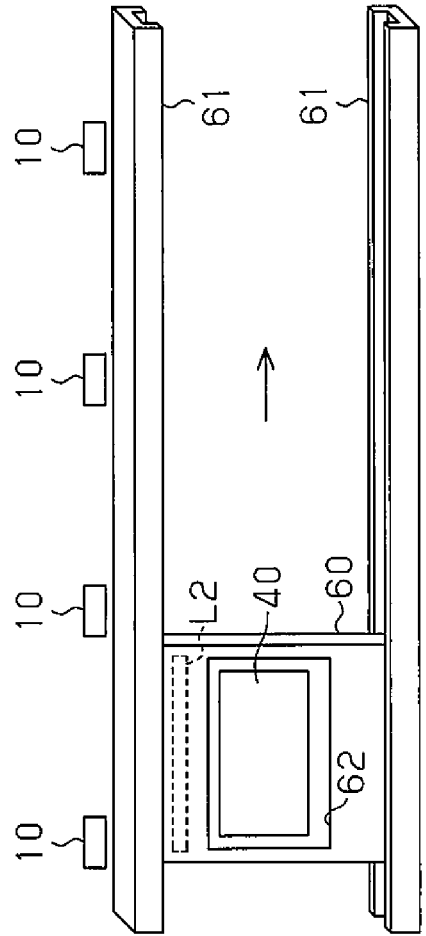
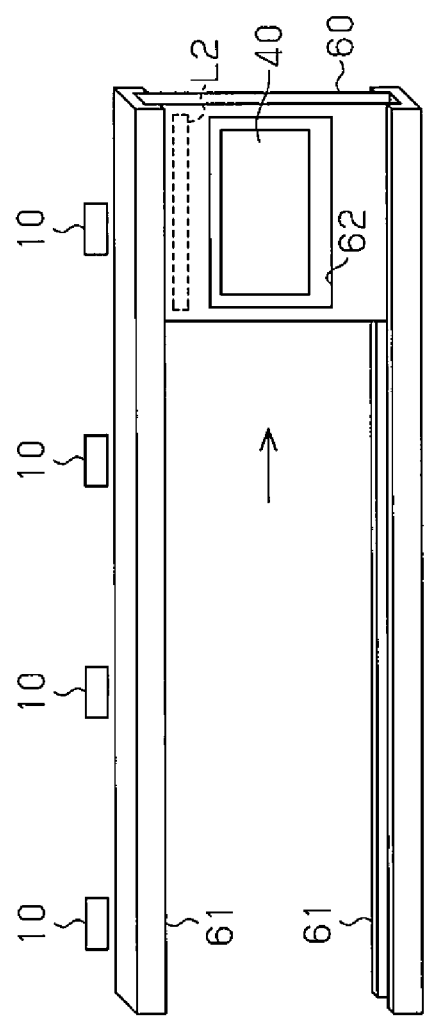
Fig.8A
Fig.8B

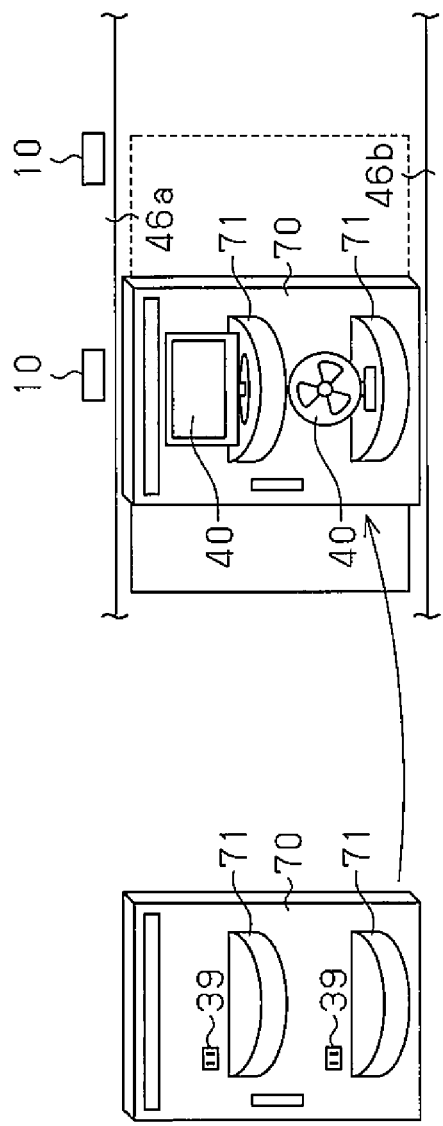

NON-CONTACT POWER SUPPLY SYSTEM

TECHNICAL FIELD

The present invention relates to a contactless power supply system.

BACKGROUND ART

In the prior art, a contactless power supply system supplies power in a contactless manner from a power supplying device to a power receiving device (refer to, for example, patent document 1). In recent years, a contactless power supply system has become able to perform contactless power supply with high efficiency. Thus, such type of a contactless power supply has become practical.

For example, there is a method for supplying power in a contactless manner from a power supply to an electric device using electromagnetic induction. This method allows for a cordless structure in which the conventional electric cord is eliminated from between the power supply and the electric device.

In particular, when the power supplying subject is a movable body, there is a great advantage to a contactless power supply since an electric cord, which would inhibit the movement of the movable body, can be omitted. Under the present circumstances, a power supplying subject, which is a movable body, may have the following structure. In the industrial field, a cart supplied with power in a contactless manner may be used in a factory, a clean room, and the like (refer to, for example, patent document 2). Also, in an ID card system, a card held by a person or an object may be placed over a reading machine to supply power from the reading machine to the ID card and perform authentication or the like with the power between the reading machine and the ID card (refer to, for example, patent document 3). Further, there is a concept of laying primary coils in a road at equal intervals to supply power to secondary coils that are coupled to a lower portion of a travelling vehicle (refer to, for example, patent document 4). These structures often use a relatively large primary coil or a number of primary coils to supply power to a single secondary coil arranged in a mobile body.

A contactless transmission device described in patent document 5 is configured such so that a movable device reciprocates relative to a fixed device. The movable device includes secondary coils arranged at fixed intervals in the moving direction of the movable device. The fixed device includes a single primary coil that faces one of the secondary coils. The contactless transmission device is configured so that the primary coil is magnetically coupled to one of the secondary coils regardless of where the movable device is located.

PRIOR ART DOCUMENT

Patent Document

Patent Document 1: Japanese Laid-Open Patent Publication No. 2003-204637
Patent Document 2: Japanese Laid-Open Patent Publication No. 7-2311
Patent Document 3: Japanese Laid-Open Patent Publication No. 2011-28381
Patent Document 4: Japanese Laid-Open Patent Publication No. 2011-167031
Patent Document 5: Japanese Laid-Open Utility Model Publication No. 7-14734

SUMMARY OF THE INVENTION

A contactless power supply system that supplies power to a movable body may be used in homes and offices. In this case, a door, a window glass, or the like may function as a movable body. For example, if the movable body is embodied in a door, the movable body may be integrated with an electric device, which is supplied with the power received by the movable body. In this structure, however, it is difficult to make changes or additions to the electric device as wished by the user. Accordingly, it is desirable that a movable body have a higher degree of freedom for the selection of an electric device.

It is an object of the present invention to provide a contactless power supply system that increases the degree of freedom for the selection of an electric device to which the movable device is mounted.

Means for Solving the Problem

To solve the above problem, a contactless power supply system according to the present invention is provided with a power supplying device, which includes a primary coil and supplies high frequency current to the primary coil to generate an alternating magnetic flux, and a movable device, which includes secondary coils that generate inductive voltage with the alternating magnetic flux. The power supplying device is fixed when set. The movable device includes at least one electric device selected by a user and coupled in a removable manner to the movable device. The movable device is configured to be movable relative to the power supplying device and be able to supply power to the at least one electric device through at least one of the secondary coils.

Preferably, in the above configuration, the movable device is held by at least one guide rail to be slidable within a fixed range, and the power supplying device is arranged within a range in which the movable device is movable.

Preferably, in the above configuration, the movable device includes at least one accommodation area that accommodates the at least one electric device.

Preferably, in the above configuration, the movable device includes a shelf on which the at least one electric device may be set.

Preferably, in the above configuration, the power supplying device includes a resonance capacitor connected in series or in parallel to the primary coil.

Preferably, in the above configuration, the movable device includes a resonance capacitor connected in series or in parallel to the secondary coil.

Preferably, in the above configuration, the secondary coils are arranged in a moving direction of the movable device relative to the power supplying device. When the primary coil includes a side having length A in the moving direction of the movable device relative to the power supplying device, the secondary coil includes a side having length C in the moving direction, and an interval of the two secondary coils is distance B; A, B, and C are set to satisfy A>B+2C.

Preferably, in the above configuration, the movable device has one or more specifications, and the movable device is coupled in a removable manner to the at least one guide rail.

Preferably, in the above configuration, the movable device includes an open/close body that is movable between a close position to partitioning two sections and an open position allowing for passage of an object.

Preferably, in the above configuration, the guide rail is arranged on a wall, a ceiling, or a floor.

Preferably, in the above configuration, the movable device includes a cart.

Preferably, the above configuration includes rectifying circuits that respectively rectifies outputs of the secondary coils, and one or more voltage stabilizing circuits that converts voltages from the rectifying circuits to a voltage that is the same as a commercial voltage and supplies the converted voltage to the electric device.

Preferably, the above configuration includes a high frequency inverter that generates the high frequency current supplied to the primary coil. The high frequency inverter is of a resonance type.

Preferably, in the above configuration, the high frequency inverter is of a single-transistor voltage resonance type.

Preferably, in the above configuration, the at least one electric device is a contactless power supplying device that supplies power in a contactless manner to another electric device.

Preferably, in the above configuration, the power supplying device includes a core of a magnetic body arranged in the primary coil.

Preferably, in the above configuration, the movable device includes cores of a magnetic bodies arranged in the secondary coils.

Preferably, in the above configuration, the movable device is coupled to a flexible structural object.

Effect of the Invention

The present invention provides a contactless power supply system that increases the degree of freedom for the selection of an electric device to which the movable device is mounted.

BRIEF DESCRIPTION OF THE DRAWINGS

FIGS. 3A and 3B are perspective views of a movable device (sliding door), FIG. 3C is a front view of a rail and the like when the sliding door is removed, FIG. 3D is a perspective view of a movable device (sliding door) on which an electric device is set, and FIGS. 3E and 3F are perspective views of the movable device (sliding door) that opens and closes.

FIGS. 4A and B are perspective views showing the positional relationship and the configuration of a primary coil L1 and a secondary coil L2 in the first embodiment.

FIG. 5A is a cross-sectional view showing the movable distance of a secondary coil L2 when there are two secondary coils L2 in the first embodiment, FIG. 5B is a cross-sectional view showing the movable distance of a secondary coil L2 when there are three secondary coils L2 are arranged, and FIG. 5C is a cross-sectional view showing the movable distance of a secondary coil L2 when there are four secondary coils L2.

FIG. 6 is a front view of the movable device in the first embodiment.

FIG. 7A is a perspective view of a movable device (cart) in a second embodiment, FIG. 7B is a perspective view of a movable device (cart) on which a TV is set, FIG. 7C is a perspective view of a movable device (cart) on which an iron is set, FIG. 7D is a perspective view showing power supplying devices arranged on walls, and FIGS. 7E and 7F are perspective views showing the usage of the movable device (cart).

FIGS. 8A and 8B are perspective views showing a movable device (slide board) of a third embodiment in a moving mode.

FIG. 11 is a perspective view of a movable device (sliding door) on which an shelf is arranged in a further embodiment.

EMBODIMENTS OF THE INVENTION

First Embodiment

A first embodiment of a contactless power supply according to the present invention will now be described with reference to FIGS. 1 to 6.

Figure 1:
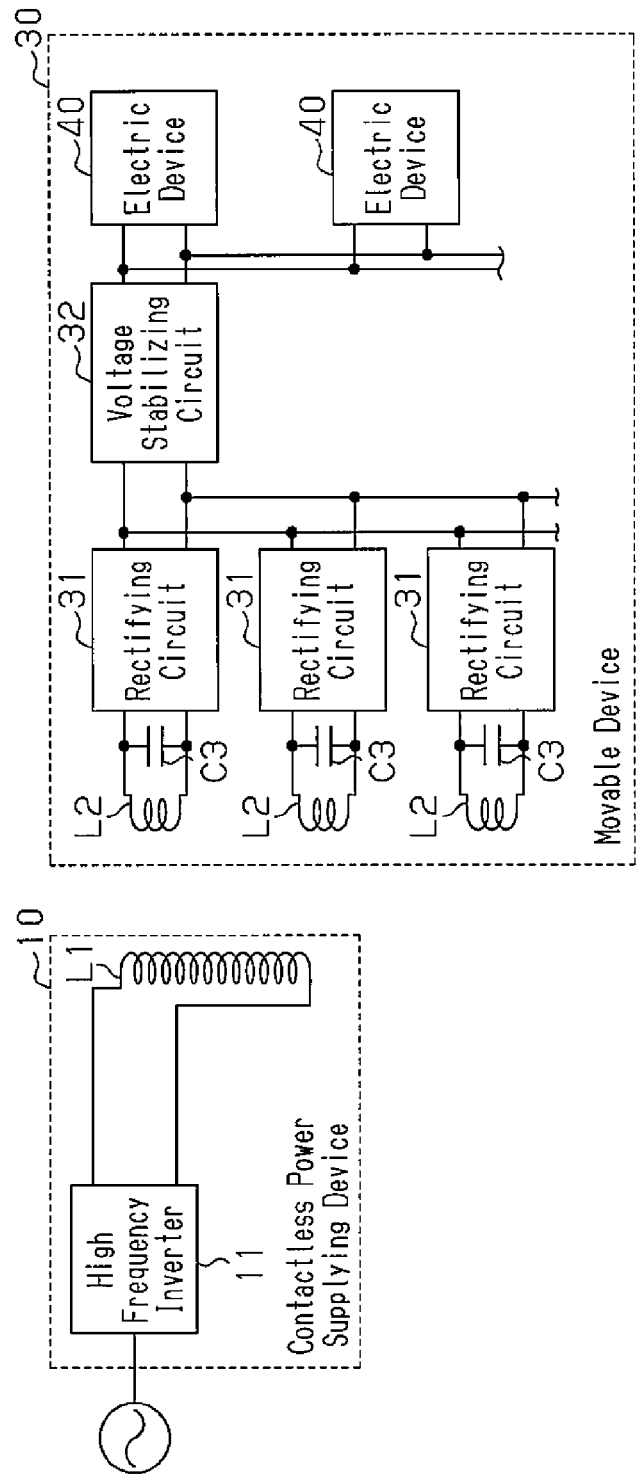
FIG. 1 is a block diagram showing the configuration of a contactless power supply system in a first embodiment.

As shown in FIG. 1, the contactless power supply system includes a power supplying device 10 and a movable device 30. The electrical configuration of the contactless power supplying device 10 and the movable device 30 will now be described.

Power Supplying Device

The contactless power supplying device 10 includes a high frequency inverter 11 and a primary coil L1.

Figure 2:
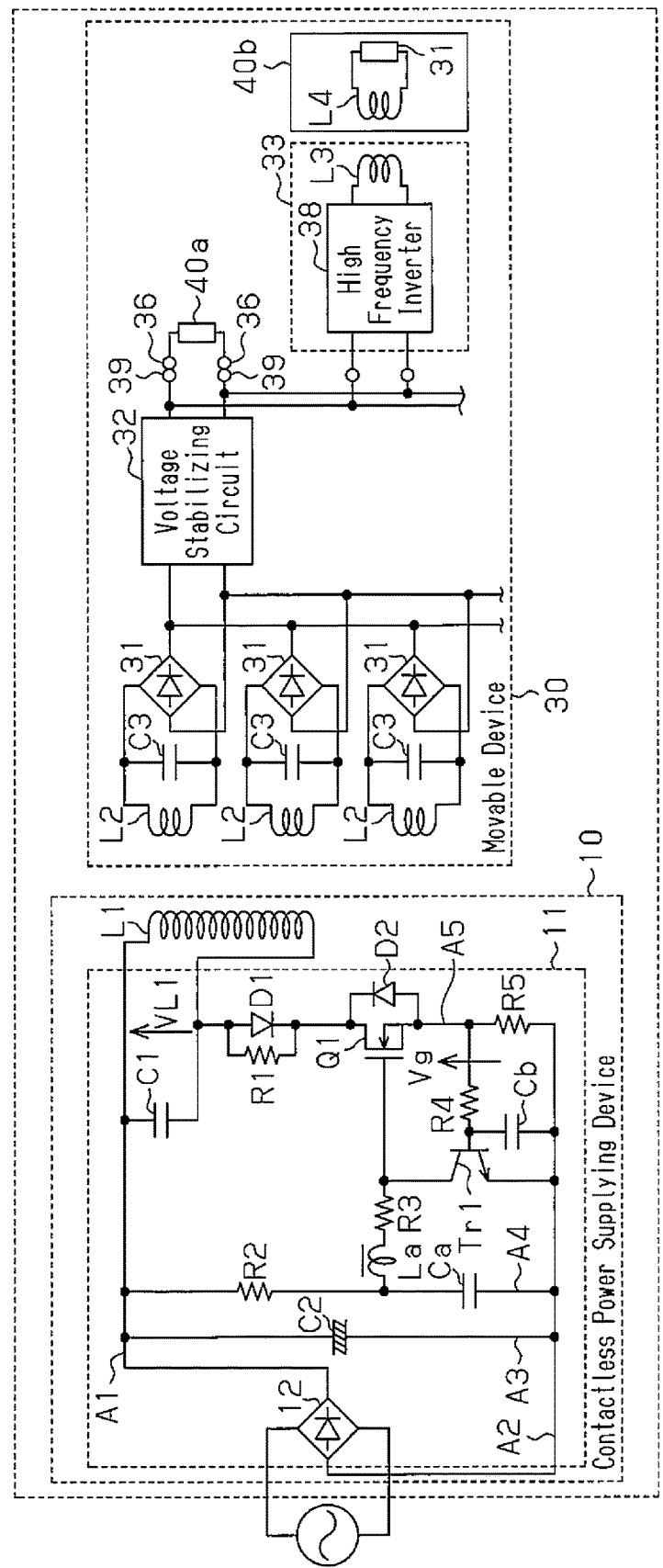
FIG. 2 is a block diagram showing the specific configuration of a high frequency inverter (single-transistor voltage resonance type inverter) and the like in the first embodiment.

The high frequency inverter 11 converts the power from a commercial power supply to high frequency current, and supplies the high frequency current to the primary coil L1. In detail, as shown in FIG. 2, the high frequency inverter 11 is formed by a single-transistor voltage resonance type inverter.

More specifically, the high frequency inverter 11 includes a primary side parallel resonance capacitor C1, a smoothing capacitor C2, a full-wave rectifying circuit 12, two capacitors Ca and Cb, two diodes D1 and D2, five resistors R1 to R5, an FET Q1, a transistor Tr1, and a feedback winding La.

The full-wave rectifying circuit 12 is connected in parallel to the commercial power supply. The full-wave rectifying circuit 12 is also connected so that current can be supplied to the circuit. The circuit includes an upstream connection line A1 and a downstream connection line A2. Three connection lines A3 to A5 are connected in parallel between the connection lines A1 and A2. The connection line A3 includes the smoothing capacitor C2. The connection line A4 includes the resistor R2 and the capacitor Ca connected in series in order from the connection line A1.

The primary side parallel resonance capacitor C1 configures an LC resonance circuit with the primary coil L1. The resistor R1 and the diode D1 configure a first parallel circuit. The FET Q1 and the diode D2 configure a second parallel circuit. The connection line A5 includes the LC resonance circuit, the first parallel circuit, the second parallel circuit, and the resistor A5 connected in series in order from the connection line A1.

The feedback winding La and the resistor R3 are connected in series between a gate terminal of the FET Q1 and a node between the resistor R2 and the capacitor Ca. The resistor R3 limits loss in the FET Q1. The collector terminal of the transistor Tr1 is connected to a node between the resistor R3 and a gate terminal of the FET Q1. An emitter terminal of the transistor Tr1 is connected to the connection line A2. The base terminal of the transistor Tr1 is connected to one end of the resistor R4. The other end of the resistor R4 is connected to a node between the resistor R5 and the second parallel circuit. Further, the capacitor Cb is connected between a node between the connection line A2 and the base terminal of the transistor Tr1 and the resistor R4.

An alternating current from a commercial power supply is full-wave rectified by the full-wave rectifying circuit 12 and then smoothed by the smoothing capacitor C2. The smoothed current is supplied to the capacitor Ca through the resistor R2. Accordingly, when the voltage of the capacitor Ca increases and the gate voltage of the FET Q1 becomes greater than or equal to a threshold, the FET Q1 goes ON. The current from the connection line A1 then flows to the primary coil L1. Thus, voltage is induced at the feedback winding La, which is magnetically coupled to the primary coil L1, so that the voltage is fed back from the primary coil L1 to the feedback winding La to start oscillation.

The current flowing to the primary coil L1 applies voltage to the base terminal of the transistor Tr1 that is greater than or equal to the threshold. Accordingly, the capacitor Ca is discharged through the feedback winding La, the resistor R3, and the transistor Tr1. Thus, the gate voltage of the FET Q1 becomes smaller than the threshold, and the FET Q1 goes OFF. In this manner, the gate voltage of the FET Q1 is controlled.

The primary side parallel resonance capacitor C1 resonates the primary coil L1. This increases the high frequency voltage of the primary coil L1.

Movable Device

The movable device 30 includes a plurality of secondary coils L2, secondary side parallel resonance capacitors C3, the number of which is the same as the number of the secondary coils L2, rectifying circuits 31, the number of which is the same as the number of the secondary coils L2, a single voltage stabilizing circuit 32, and an incorporated power supplying device 33.

The secondary coil L2 and the secondary side parallel resonance capacitor C3 are connected in parallel. The secondary coil L2 generates an inductive current with the alternating magnetic flux generated by the primary coil L1. The secondary side parallel resonance capacitor C3 allows the output voltage of the secondary coil L2 to be increased or adjusted to a constant voltage.

The rectifying circuit 31 full-wave rectifies the inductive current and outputs the rectified current to the voltage stabilizing circuit 32. The voltage stabilizing circuit 32 converts the voltage from the rectifying circuit 31 to voltage that is the same as the commercial voltage having the commercial power supply frequency and supplies the converted voltage to electric devices 40. The electric devices 40 include first and second electric devices 40a and 40b. The electric devices 40a and 40b are removable from the movable device 30.

An outlet 39 is connected to the voltage stabilizing circuit 32. The first electric device 40a includes a plug 36. The first electric device 40a and the voltage stabilizing circuit 32 are electrically connected by connecting the plug 36 to the outlet 39. The first electric device 40a includes a flat-screen TV, a speaker, a lighting device, and a fan.

The incorporated power supplying device 33 is connected by a wire to the voltage stabilizing circuit 32 in the same manner as the first electric device 40a. In other words, the incorporated power supplying device 33 is also an electric device.

The incorporated power supplying device 33 includes a high frequency inverter 38 and a power supplying coil L3. The high frequency inverter 38 converts the current from the voltage stabilizing circuit 32 to high frequency current and supplies the high frequency current to the power supplying coil L3. Thus, the power supplying coil L3 generates alternating magnetic flux.

The second electric device 40b includes a portable terminal. The second electric device 40b includes a power receiving coil L4 and the rectifying circuit 31. The power receiving coil L4 induces current with the alternating magnetic flux from the power supplying coil L3. The rectifying circuit 31 rectifies the inductive current and charges a secondary battery (not shown) of the portable terminal with the rectified current.

The mechanical configuration of the movable device 30 and the contactless power supplying device 10 will now be described.

As shown in FIG. 3A, the movable device 30 is configured as a sliding door that partitions a home into rooms in the present example. The sliding door is, for example, formed by a rectangular plate having a thickness of 40 mm and made of wood, glass, plastic, wall material, or the like.

As shown in FIGS. 3E and 3F, the upper and lower ends of the movable device 30, which is the sliding door, are respectively supported by two rails 46a and 46b to be slidable in the left and right directions as viewed in the drawing. The user opens and closes the movable device 30 in the left and right directions as viewed in the drawing with a handle 44 when moving between two rooms. In the open state, the sliding door is located in a door case 43, which is shown by broken lines in the drawing. The sliding door is configured to be removable from the two rails 46a and 46b by the user.

The movable device 30 includes accommodation areas 41 in which electric devices are arranged. Each accommodation area 41 includes a tetragonal cavity that opens toward the user. In the configuration shown in FIG. 3A, six accommodation areas 41 are arranged in two rows and three columns. The accommodation area 41 has a square shape as viewed from the thickness direction of the movable device 30. In the configuration shown in FIG. 3B, two accommodation areas 41 are arranged one above the other. The two accommodation areas 41 have rectangular shapes with the long side extending in the left to right direction as viewed from the thickness direction of the movable device 30.

As shown in FIG. 3D, a flat-screen TV and a fan, which function as the electric devices 40, are arranged in the accommodation areas 41. Other electric devices include, for example, a digital photo frame, a lighting device including an LED and an organic EL, a portable terminal, or the like.

As shown in FIGS. 3A and 3B, an outlet 39 is arranged in each accommodation area 41. When the first electric device 40a is arranged in the accommodation area 41, the plug 36 of the first electric device 40a is inserted into the outlet 39. As shown in FIG. 2, the insertion of the plug 36 electrically connects the first electric device 40a and the voltage stabilizing circuit 32.

The incorporated power supplying device 33 is arranged in each accommodation area 41. When a second electric device 40b such as a portable terminal is arranged in the accommodation area 41, electromagnetic induction allows contactless power supply to be performed from the incorporated power supplying device 33 to the second electric device 40b.

One of the outlet 39 and the incorporated power supplying device 33 may be arranged in each accommodation area 41. Alternatively, the outlet 39 and the incorporated power supplying device 33 may both be arranged in each accommodation area 41.

As shown by the broken lines in FIG. 3A, the secondary coils L2 are arranged in the left to right direction at the upper end of the movable device 30.

Further, as shown in the lower right accommodation area 41 of FIG. 3A, when an accommodation area 41 does not receive an electric device 40, an ornamental member 45 having an outer shape corresponding to the accommodation area 41 may be fitted into the accommodation area 41. By fitting the ornamental member 45 into the accommodation area 41, the sliding door has a normal outer appearance. In particular, by forming the ornamental member 45 to have the shape of a plate shape, an electric device 40 arranged in the accommodation area 41 may be hidden from the outside.

In FIGS. 3E and 3F, the contactless power supplying devices 10 are embedded in the wall above the rail 46a. The contactless power supplying device 10 may also be externally coupled to the wall. In the present example, the contactless power supplying devices 10 are located at a position corresponding to the upper right corner when the movable device 30 is closed and a position corresponding to the upper right corner when the movable device 30 is open.

A specific configuration of the primary coil L1 and the secondary coils L2 will now be described with reference to FIGS. 4A and 4B. In the present example, the coils L1 and L2 are both square planar coils and stacked on a plate-shaped core 37. A plurality of (four in the present example) secondary coils L2 move relative to the primary coil L1, which is fixed, when opening and closing the movable device 30.

As shown in the drawings, the primary coil L1 includes a side having length A, and the secondary coil L2 includes a side having length C. The distance between two adjacent secondary coils L2 is set to length B. In this case, the size and positional relationship of the coils L1 and L2 are set to satisfy the condition of A≥B+2C.

By satisfying this condition, regardless of where the movable device 30 is located, one of the secondary coils L2 faces the primary coil L1 and, consequently, allows power to be supplied from the primary coil L1 to the secondary coil L2.

FIGS. 5A to 5C show the movable distance X of the movable device 30 when there is an n number of secondary coils L2 in a structure satisfying the above condition. The movable distance refers to a range in which one of the secondary coils L2 faces the primary coil L1 so that the supply of power is enabled. The movable distance X is obtained from the equation of "X=(A−C)×n". The present example is set to satisfy A=10 cm, B=8 cm, and C=1 cm.

As shown in FIG. 5A, the movable distance of the movable device 30 is 18 cm when there are two secondary coils L2. As shown in FIG. 5B, the movable distance of the movable device 30 is 27 cm when there are three secondary coils L2. As shown in FIG. 5C, the movable distance of the movable device 30 is 36 cm when there are four secondary coils L2. Eleven secondary coils L2 are required to obtain a movable distance of about one meter.

FIG. 6 shows an example of the arrangement of movable devices 30 that differs from FIG. 2.

In the present example, two movable devices 30a and 30b (sliding door) are fitted in a sliding door frame 47 so as to be slidable in the left and right directions. When the right end face of the movable device 30a and the left end face of the movable device 30b are in contact at a middle of a sliding door frame 47, which extends in the left to right direction, the two movable devices 30a and 30b close and partition rooms. The movable devices 30a and 30b are moved away from each other in opening directions from these positions to open so that a person or the like may move between the two rooms.

Three accommodation areas 41 are arranged in the movable device 30a. More specifically, a relatively large single accommodation area 41 is arranged in the upper side of the movable device 30a. Two relatively small left and right accommodation areas 41 are arranged in the lower side of the movable device 30a. A flat-screen TV, which is a first electric device 40a, is arranged in the large accommodation area 41. Left and right speakers, which are first electric devices 40a, are installed in the small accommodation area 41. The flat-screen TV and the two speakers are each connected to the voltage stabilizing circuit 32 by a plug 36 and an outlet 39.

In the movable device 30b, six small accommodation areas 41 are arranged in three rows and two columns. A portable terminal, which is a second electric device 40b, and a lighting device and a digital photo frame, which are first electric devices 40a, are arranged in the accommodation areas 41. The electric devices may be connected to the voltage stabilizing circuit 32 by a plug 36 and an outlet 39 or may be supplied with power in contactless manner from the movable device 30b through the incorporated power supplying device 33. In particular, since the portable device is frequently charged, by performing charging in a contactless manner with the incorporated power supplying device 33, there is no need to insert the plug each time a charging is performed.

Contactless power supplying devices 10 (primary coils L1) are arranged near the upper right corner and the upper left corner of the sliding door frame 47. The secondary coils L2 are arranged along the upper end of each of the movable devices 30a and 30b. The relationship of the two primary coils L1 and the plurality of secondary coils L2 is set to satisfy the above condition (A≥B+2C) described with reference to FIG. 4.

The embodiment described above has the following advantages.

(1) When a preferred electric device such as a flat-screen TV, a photo frame, or the like is arranged in an accommodation area 41 of the movable device 30, the electric device is operated. The degree of freedom for the selection of the electric device arranged in the movable device 30 is thus increased.

Further, the sliding door (movable device 30) is slidable. Thus, the position of the sliding door, and consequently, the electric device is changeable in accordance with the preference of the user. Thus, a highly convenient contactless power supply system is provided.

(2) Different types of sliding doors (movable device 30) having the same outer shape and different internal specifications (number, size, and the like of the accommodation areas 41) may be prepared. The user may remove the movable device 30 from the two rails 46a and 46b by oneself. This allows the user to replace the movable device 30 in accordance with the season or preference.

(3) The resonance capacitor C1 is connected in parallel to the primary coil L1. Further, the resonance capacitor C3 is arranged in parallel to the secondary coil L2. This increases the high frequency voltage at the side of the primary coil L1 and, in the same manner, increases the output voltage at the side of the secondary coil L2 or adjusts the output voltage to a constant voltage. Further, power may be transmitted with high efficiency even if the degree of magnetic coupling between the primary coil L1 and the secondary coil L2 is small.

(4) The primary coil L1 includes a side having length A in the moving direction of the movable device 30, the secondary coil L2 includes a side having length C in the moving direction, and the interval of the two secondary coils L2 is distance B. The movable device 30 includes a side having length D in the moving direction. The shape and positional relationship of the coils L1 and L2 are set to satisfy the condition of A>B+2C, and A<D. By minimizing the number of secondary coils L2 in a range satisfying this condition, the movable device 30 is formed more easily while allowing for the coils L1 and L2 to correspond with each other regardless of the position of the movable device 30. Accordingly, compared to the conventional configuration that lays out coils along the moving distance of the movable device 30, the structure may be reduced in size, construction may be simplified, and costs may be decreased.

(5) The movable device 30 is configured to be replaceable when necessary. Accordingly, for example, when a lighting device is arranged in the accommodation area 41, the movable device 30 may be removed and replaced by a normal sliding door if lighting is not necessary.

Further, by preparing movable devices 30 that accommodate electric devices of different specifications in different manners (number and size of accommodation areas 41), the movable device 30 may be replaced in accordance with purpose such as for a TV, a stereo, lighting, air current generation, and the like. This allows for usage that is in accordance with one's lifestyle and is thus convenient. Further, the movable device 30 may be arranged in place, removed, or carried by the user. Thus, the user may perform the replacement without relying on a specialist.

(6) The voltage stabilizing circuit 32 converts the voltage from the rectifying circuit 31 to a voltage that is the same as the commercial voltage having the commercial power supply frequency. Accordingly, the commercially available electric device may be used, without undergoing any preparations, for the movable device 30.

(7) The high frequency inverter 11 is of a resonance type and thus improves the inverter efficiency and, consequently, the system efficiency. Further, the high frequency inverter 11 also functions as a resonance circuit for the primary coil L1. This simplifies the circuit and lowers costs.

Further, the high frequency inverter 11 is of a single-transistor voltage resonance type and is thus easy to form compared to a full-bridge type and a half-bridge type. This lowers costs.

(8) The incorporated power supplying device 33 is connected to the voltage stabilizing circuit 32. The power is supplied in a contactless manner to the portable terminal or the like arranged in the accommodation area 41 through the incorporated power supplying device 33. Thus, a portable terminal or the like may be charged by simply installing the portable terminal or the like in the accommodation area 41. This improves the convenience.

(9) The core 37 is arranged in the primary coil L1 and the secondary coil L2. This increases the degree of magnetic coupling between the coils L1 and L2 and achieves miniaturization and high efficiency of the coils.

(10) A sliding door that supplies power to an electric device may easily be realized by simply replacing a normal sliding door fitted to the existing rails 46a and 46b or the sliding door frame 47 with the movable device 30. Further, since the two existing rails 46a and 46b are used, there is no need to prepare two new rails 46a and 46b and the like for the contactless power supply system.

(11) The sliding door has a normal outer appearance when the ornamental member 45 is fitted to the accommodation area 41. This increases the ornamentality of the movable device 30. The ornamental member 45 may have the same color as the movable device 30 or have a different color from the movable device 30.

Further, when the ornamental member 45 has the shape of a plate, an electric device 40 arranged in the accommodation area 41 may be hidden from the outside. Thus, for example, by fitting the ornamental member 45 to the accommodation area 41 when the fan is not in use, the outer appearance would be tidy.

Second Embodiment

A second embodiment of the present invention will now be described with reference to FIG. 7. The contactless power supply system of the present embodiment is substantially similar to the first embodiment except in that the movable device is a cart and that the location of the power supplying device differs from the first embodiment. The description hereafter will focus on differences from the first embodiment.

As shown in FIG. 7A, the movable device 50 is configured as a cart including a box-shaped base 51 and four wheels 52 coupled to the lower surface of the base 51. Secondary coils L2 are arranged in the longitudinal direction in the rear surface of the base 51.

As shown in FIGS. 7B and 7C, an electric device 40 such as a TV, an iron, and the like is set on the upper surface of the base 51. In the same manner as the first embodiment, power may be supplied from the movable device 50 to the electric device 40 through a configuration in which the plug of the electric device 40 is inserted into an outlet arranged in the movable device 50. Alternatively, power may be supplied in a contactless manner through the incorporated power supplying device 33 arranged in the movable device 50.

As shown in FIG. 7D, a contactless power supplying device 10 is arranged at a low location (where the outlet is generally arranged) in the wall. The contactless power supplying device 10 may be embedded in the wall or externally coupled to the wall.

In the configuration described above, the movable device 50 on which the TV is set is moved with the wheels 52. In this case, as shown in FIG. 7E, the movable device 50 is moved from a position where one contactless power supplying device 10 is located to a position where another contactless power supplying device 10 is located. The coils L1 and L2 facing each other in these conditions. Thus, power may be supplied from the contactless power supplying device 10 to the TV through the movable device 50.

As shown in FIG. 7F, if an iron is set on the movable device 50, the movable device 50 is prepared only when using the iron and arranged proximal to a contactless power supplying device in accordance with the user preference or other circumstances of the day. This allows the iron to be supplied with power. In such a configuration, for example, convenience may be improved by using the upper surface of the movable device 50 as an iron board.

The embodiment described above has the following advantages.

(12) Power is supplied to the electric device by moving the movable device 50 on which the electric device is set so that the coils L1 and L2 face each other. Thus, the location of the electric device is easily changed without performing a wire connection with a plug or the like.

(13) Power may be supplied to an electric device having a relatively large size as long as the electric device can be set on the movable device 50 (cart).

Third Embodiment

A third embodiment of the present invention will now be described with reference to FIG. 8. The contactless power supply system of the present embodiment is substantially the same as the first embodiment except in that the movable device is a slide board. The description hereafter will focus on differences from the first embodiment.

As shown in FIG. 8A, a movable device 60 is formed as a slide board. The movable device 60 also includes an accommodation area 62. A wall-suspended TV, which is the electric device 40, for example, is fitted into the accommodation area 62. The wall-suspended TV is removable from the accommodation area 62.

Recessed guide rails 61 extending in the left to right direction are fixed to a wall. The guide rails 61 are fixed to the wall by screws, an adhesive, or the like. The two guide rails 61 are arranged so that the open sides face each other. The movable device 60 (slide board) is fitted between the two guide rails 61. The movable device 60 slides in the direction the guide rails 61 extend. The upper and lower ends of the movable device 60 slide along the inner surfaces of the guide rails 61. Secondary coils L2 are arranged in the left to right direction at the upper end of the movable device 60. Contactless power supplying devices 10 are embedded or externally coupled to the wall above the upper guide rail 61. In the present example, four contactless power supplying devices 10 are arranged at equal intervals over the entire region of the guide rail 61. The shape and positional relationship of the coils L1 and L2 are set to be similar to the first embodiment described with reference to FIG. 4. In the configuration described above, the movable device 60 may be manually moved along the guide rails 61, as shown in FIG. 8B.

The embodiment described above particularly has the following advantage.

(14) The electric device 40 (e.g., TV) is easily moved to a preferred position by moving the movable device 60 along the two guide rails 61 coupled to the wall. This improves the convenience.

The embodiments described above may be modified as described below.

In the first embodiment, the movable device 30 is a sliding door but is not limited to a sliding door as long as the movable device 30 is a body that opens and closes by reciprocating in the same manner as a sliding door. The movable device may be a window glass, a paper door, a Fusuma, a partitioning wall, or a slide door for a furniture.

The first embodiment includes two contactless power supplying devices 10. However, one, three, or more contactless power supplying devices 10 may be used. If a single contactless power supplying device 10 is used, the moving distance for the opening and closing performed with the movable device 30 is limited so that power may be supplied from the contactless power supplying device 10 to the movable device 30 regardless of where the movable device 30 is located.

Figure 9:
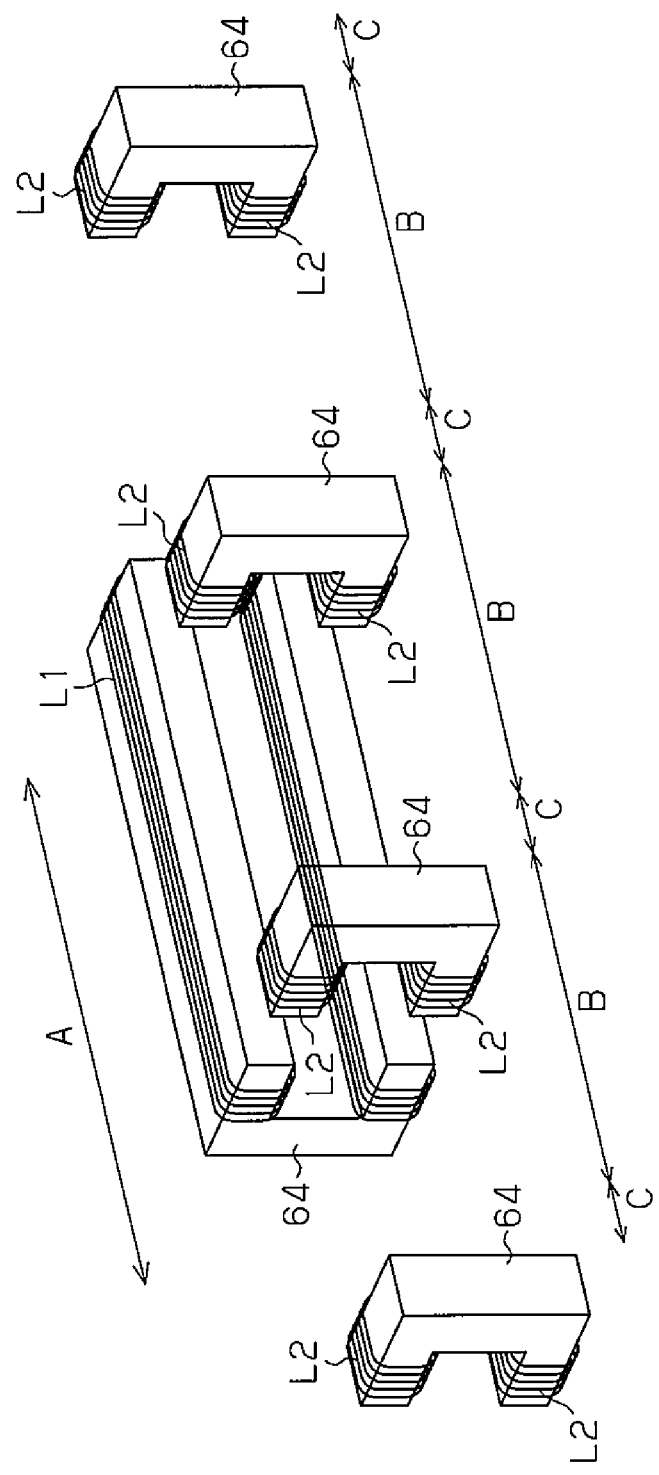
FIG. 9 is a perspective view showing the positional relationship and the configuration of coils L1 and L2 in another embodiment.

In each embodiment described above, the coils L1 and L2 are square planar coils and stacked on the plate shaped cores 37. However, the coils and the cores are not limited to such structure. For example, as shown in FIG. 9, a core 64 of a magnetic body may have a horseshoe shape, and the two coils L1 and L2 may be wound around the two ends of the core 64, respectively. Alternatively, the core 64 of the magnetic body may be an E-shaped core or a coreless coil. In such cases, the relationship between the primary coil L1 and the secondary coils L2 is also set to satisfy the above condition (A≥B+2) described with reference to FIG. 4.

Figure 10:
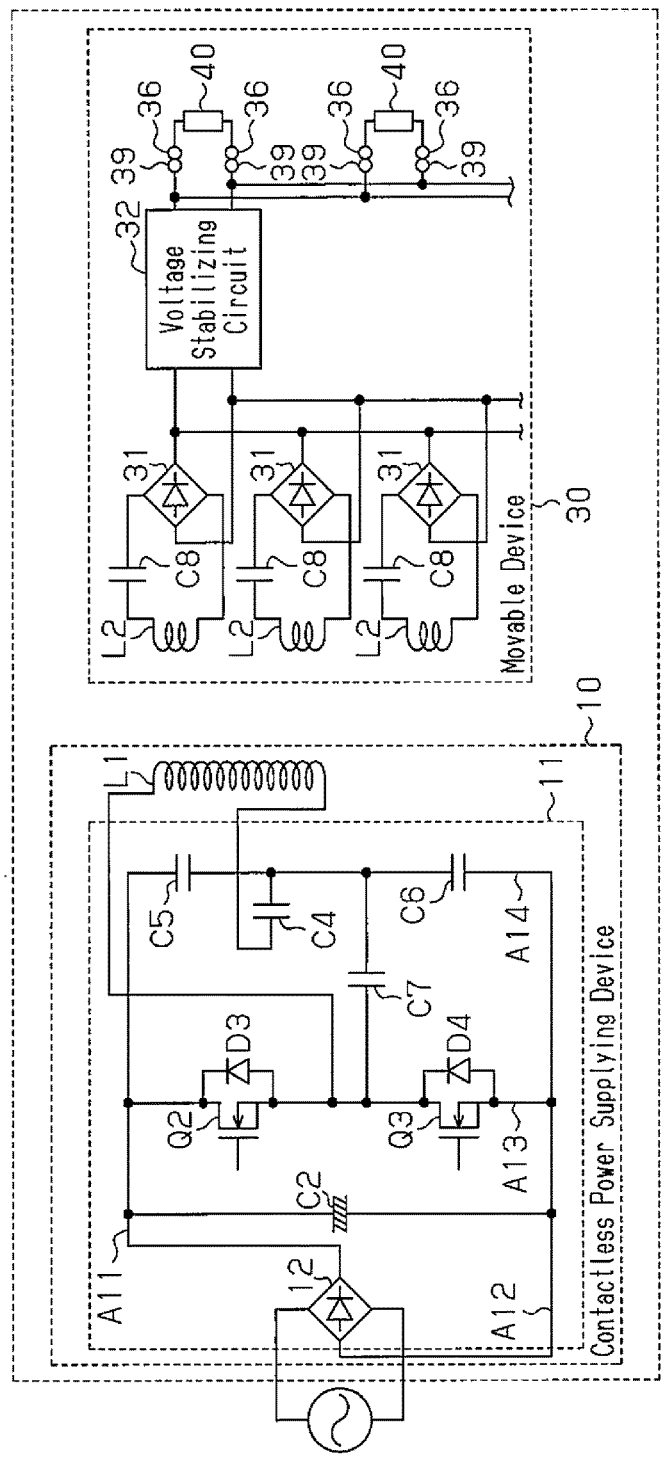
FIG. 10 is a block diagram showing the specific configuration of a high frequency inverter (double-transistor half-bridge type partial resonance inverter) and the like in a further embodiment.

In each embodiment described above, the high frequency inverter 11 is configured by a single-transistor voltage resonance type inverter. However, the high frequency inverter 11 is not limited to a single-transistor voltage resonance type inverter and may be a double-transistor half-bridge partial resonance type inverter as shown in FIG. 10. The inverter of FIG. 10 includes the full-wave rectifying circuit 12, the smoothing capacitor C2, two FETs Q2 and Q3, two parasitic diodes D3 and D4, and four capacitors C4 to C7.

The capacitor C4 is a primary side series resonance capacitor and is series-connected to the primary coil L1. Two connection lines A13 and A14 are connected between an upstream connection line A11 and a downstream connection line A12. The FET Q2 and the FET Q3 are connected in series between the connection line A11 and the connection line A13. The parasitic diode D3 is connected in parallel to the FET Q2. The parasitic diode D4 is connected in parallel to the FET Q3. The capacitor C5 and the capacitor C6 are connected in series between the connection line A11 and the connection line A14. The primary coil L1 and the capacitor C4 are connected in series between a node of the two FETs Q2 and Q3 in the connection line A13 and a node of the two capacitors C5 and C6 in the connection line A14. The capacitor C7 is connected in parallel to the primary coil L1 and the capacitor C4.

In the configuration described above, current from the full-wave rectifying circuit 12 flows to the primary coil L1 through the FET Q2 when the FET Q2 goes ON and the FET Q3 goes OFF. When the FET Q2 goes OFF and the FET Q3 goes ON from this condition, current flows in the reverse direction (reverse electromotive current) to the primary coil L1. Thus, the primary coil L1 is oscillated as the two FETs Q2 and Q3 alternately go ON. The primary coil L1 resonates when the capacitor C4, which is the primary side series resonance capacitor, is connecting in series to the primary coil L1. This increases the high frequency voltage of the primary coil.

In the configuration described above, a secondary side series resonance capacitor C8 is connected in series to each secondary coil L2. The output voltage of the secondary coil L2 is increased or adjusted to a constant voltage by the secondary side series resonance capacitor C8.

In each embodiment described above, the ornamental member 45 is fitted to the accommodation area 41 but may be coupled to the movable device in advance like a shutter or a roll curtain. In this structure, the accommodation area 41 can be easily hidden by pulling out the ornamental member 45. The possibility of loss of the ornamental member 45 also does not arise.

In the first embodiment, the accommodation area 41 is formed to open toward the user. However, the accommodation area 41 may extend through the movable device 30 (sliding door) in the thickness direction. In such a configuration, the electric device in the accommodation area 41 may be used from both sides of the movable device 30. In other words, if the movable device 30 is used to partition rooms, the electric device may be used from both rooms.

The bottom surface of the accommodation area 41 may be formed from glass, plastic, wood, or the like. This improves the ornamentality of the sliding door. Further, the locations of the outlet 39 and the incorporated power supplying device 33 in the accommodation area 41 may be changed.

In the second embodiment, the movable device 50 is a cart but is not limited in such a manner as long as it is a furniture provided with wheels 52 like a cart and may be a storage furniture provided with wheels.

In the second embodiment, the contactless power supplying device 10 is arranged in a wall. However, the contactless power supplying device 10 may be arranged in a floor.

In the first embodiment, the electric device 40 is arranged in the accommodation area 41 of the movable device 30. Instead, as shown in FIG. 11, shelves 71 may be coupled to the movable device 70, and electric devices 40 may be set on the shelves 71. The shelves 71 have the shape of semicircular plates are orthogonal to the plane of the movable device 70. The number, shape, or size of the shelves 71 may be changed in accordance with the electric devices 40 that are set.

For example, a slot may be formed in the movable device 30 to receive a shelf. Power may be supplied from the movable device 70 to the electric device 40 in this structure by inserting the plug of an electric device 40 into an outlet arranged in the movable device 70 or by supplying power in a contactless manner with an incorporated power supplying device 33 arranged in the movable device 70 in the same manner as the first embodiment. This structure allows for power to be supplied to an electric device 40 that is relatively large.

Figure 12:
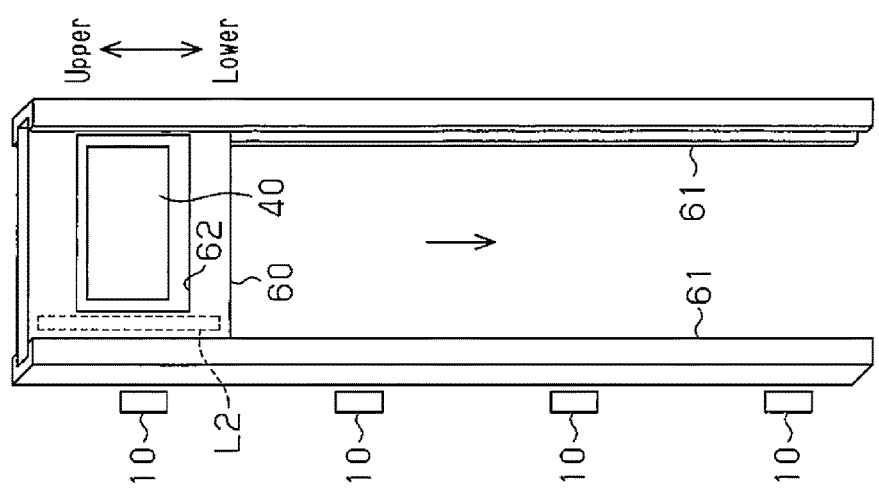
FIG. 12 is a perspective view of a movable device (slide board) that moves in a vertical direction in a further embodiment.

In the third embodiment, the two guide rails 61 extend in the left to right direction. However, the two guide rails 61 may be extended in the vertical direction, as shown in FIG. 12. In this case, the movable device 30 may slide in the height direction so that the use can watch the TV at the preferred height, for example.

The guide rails 61 may be arranged over two rooms. This allows an electric device 40 to be shared between the two rooms.

Figure 13:
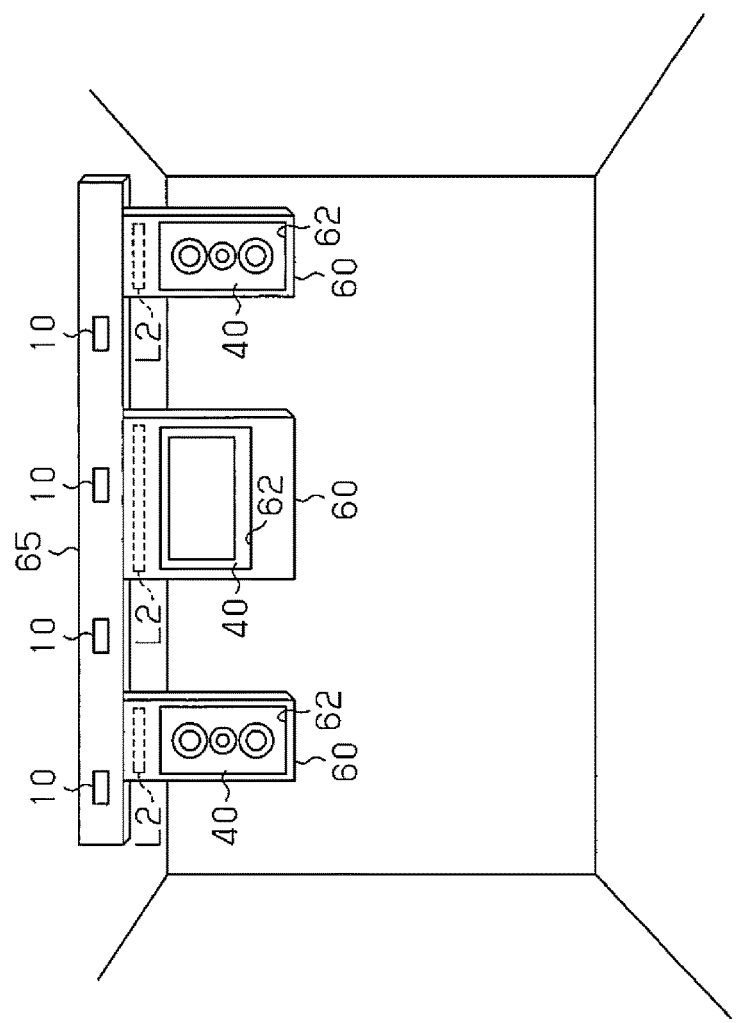
FIG. 13 is a perspective view of a movable device suspended and supported to be slidable by an upper guide rail in a further embodiment.

Further, as shown in FIG. 13, by using only the upper guide rail 65, the movable device 60 may be suspended from the guide rail 65 and supported to be slidable. The present example includes three movable devices 60, in which the middle movable device 60 is a TV and the left and right movable devices 60 are speakers. A preferred acoustic condition may be realized by adjusting the positions of the movable devices 60. Further, the ceiling area may be effectively used.

When this configuration is applied to a window glass, for example, the transparency of the window glass may be used to implement a liquid crystal shutter function when supplied with power. A lighting or display device such as an organic EL lighting device, an organic EL display, and the like may be arranged in the window glass in combination with a transparent electrode.

The guide rails 61 and 65 may be arranged on the ceiling or the floor. The movable device may also be attached to a structural object having a flexible shape such as a curtain, shutter, and the like. This increases the locations in a house when the movable device 60 may be applied.

In the third embodiment and the configuration of FIG. 13, the movable device 60 may be configured to automatically moving along the guide rails 61 and 65. In this case, the movable device 60 is movable along the guide rails 61 and 65 by the drive force of a motor or the like when operated by the user. In this case, the movable device 60 does not need to be manually moved. This improves the convenience. In particular, if the movable device 60 is located at a high position and cannot be reached by the user, the movable device 60 may be moved by an operation means (remote controller).

In the first embodiment, the movable device 30 is a sliding door but may be configured as a hinged door that pivots about an axis. In this case, power may be supplied to the electric device only when the hinged door is closed. Further, the coils L1 and L2 may be configured to be arranged in correspondence when the hinged door is completely open.

The rail may be arcuate, and the movable device 60 may also be curved to have a curvature corresponding to the arc of the rail.

In each embodiment described above, power is supplied through the electromagnetic induction from the contactless power supplying device 10 to the movable devices 30, 50, and 60. Instead, power may be supplied through magnetic resonance, for example. Further, power may be supplied using an electric field and electromagnetic waves.

Further, the technique, mechanism, structure, and the like commonly used with a normal contactless power supply system, such as a metal extraneous substance detecting function, an authentication function, shielding of magnetic fields and electric fields, heat dissipation mechanism for dissipating heat form a circuit or the like, an anti-noise circuit, and energy-saving sleeping through intermittent coil excitation.

In the first embodiment, the accommodation area 41 is formed in the movable device 30, which is the sliding door. However, the accommodation area 41 may be formed in the cart of the second embodiment. This effectively uses dead space of the base 51.

In each embodiment described above, a single voltage stabilizing circuit 32 is used for a plurality of rectifying circuits 31. Instead, a voltage stabilizing circuit 32 may be provided for each rectifying circuit 31.

In each embodiment described above, the voltage stabilizing circuit 32 converts the voltage from the rectifying circuit 31 to voltage that is the same as the commercial voltage. However, the voltage stabilizing circuit 32 may convert the voltage to a voltage that differs from the commercial voltage. In this case, a transformer or the like is additionally needed.

The movable devices 30, 50, and 60 in the embodiments described above do not have to be used indoors and may be used outdoors.

DESCRIPTION OF REFERENCE CHARACTERS

10: contactless power supplying device
11, 38: high frequency inverter
30, 30a, 30b, 50, 60, 70: movable device
31: rectifying circuit
32: voltage stabilizing circuit
40, 40a, 40b: electric device
41, 62: accommodation area
61, 65: guide rail
71: shelf L1: primary coil
L2: secondary coil

The invention claimed is:

1. A contactless power supply system comprising:
   a power supplying device including a primary coil and supplies high frequency current to the primary coil to generate an alternating magnetic flux; and
   a movable device including secondary coils that generate inductive voltage with the alternating magnetic flux, wherein
   the power supplying device is fixed when set,
   the movable device includes at least one accommodation area in which at least one electric device selected by a user is arranged,
   the movable device is held by at least one guide rail to be slidable within a fixed range,
   the movable device is coupled in a removable manner to the at least one guide rail, and
   the movable device is configured to be movable relative to the power supplying device and be able to supply power to the at least one electric device through at least one of the secondary coils,
   the secondary coils are arranged in a moving direction of the movable device relative to the power supplying device,
   when the primary coil includes a side having length A in the moving direction of the movable device relative to the power supplying device, the secondary coil includes a side having length C in the moving direction, an interval of the two secondary coils is distance B, and the movable device includes a side having length D in the moving direction,
   A, B, and C are set to satisfy $A > B + 2C$, and
   A are further set to satisfy $A < D$.

2. The contactless power supply system according to claim 1, wherein the movable device includes at least one accommodation area that accommodates the at least one electric device.

3. The contactless power supply system according to claim 1, wherein the movable device includes a shelf on which the at least one electric device may be set.

4. The contactless power supply system according to claim 1, wherein the power supplying device includes a resonance capacitor connected in series or in parallel to the primary coil.

5. The contactless power supply system according to claim 1, wherein the movable device includes a resonance capacitor connected in series or in parallel to the secondary coil.

6. The contactless power supply system according to claim 1, wherein
   the movable device has one or more specifications.

7. The contactless power supply system according to claim 1, wherein the movable device includes an open/close body that is movable between a close position to partitioning two sections and an open position allowing for passage of an object.

8. The contactless power supply system according to claim 1, wherein the guide rail is arranged on a wall, a ceiling, or a floor.

9. The contactless power supply system according to claim 1, wherein the movable device includes a cart.

10. The contactless power supply system according to claim 1, further comprising:
    rectifying circuits that respectively rectifies outputs of the secondary coils, and
    one or more voltage stabilizing circuits that converts voltages from the rectifying circuits to a voltage that is the same as a commercial voltage and supplies the converted voltage to the electric device.

11. The contactless power supply system according to claim 1, further comprising:
    a high frequency inverter that generates the high frequency current supplied to the primary coil,
    wherein the high frequency inverter is of a resonance type.

12. The contactless power supply system according to claim 11, wherein the high frequency inverter is of a single-transistor voltage resonance type.

13. The contactless power supply system according to claim 1, wherein the at least one electric device is a contactless power supplying device that supplies power in a contactless manner to another electric device.

14. The contactless power supply system according to claim 1, wherein the power supplying device includes a core of a magnetic body arranged in the primary coil.

15. The contactless power supply system according to claim 1, wherein the movable device includes cores of a magnetic bodies arranged in the secondary coils.

16. The contactless power supply system according to claim 1, wherein the movable device is coupled to a flexible structural object.

* * * * *